United States Patent Office 3,331,524
Patented July 18, 1967

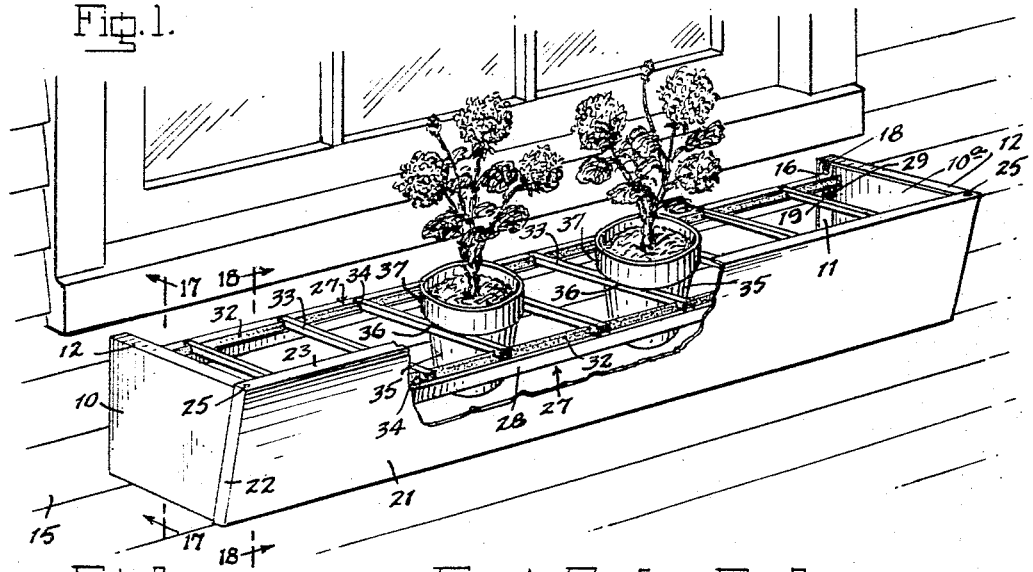

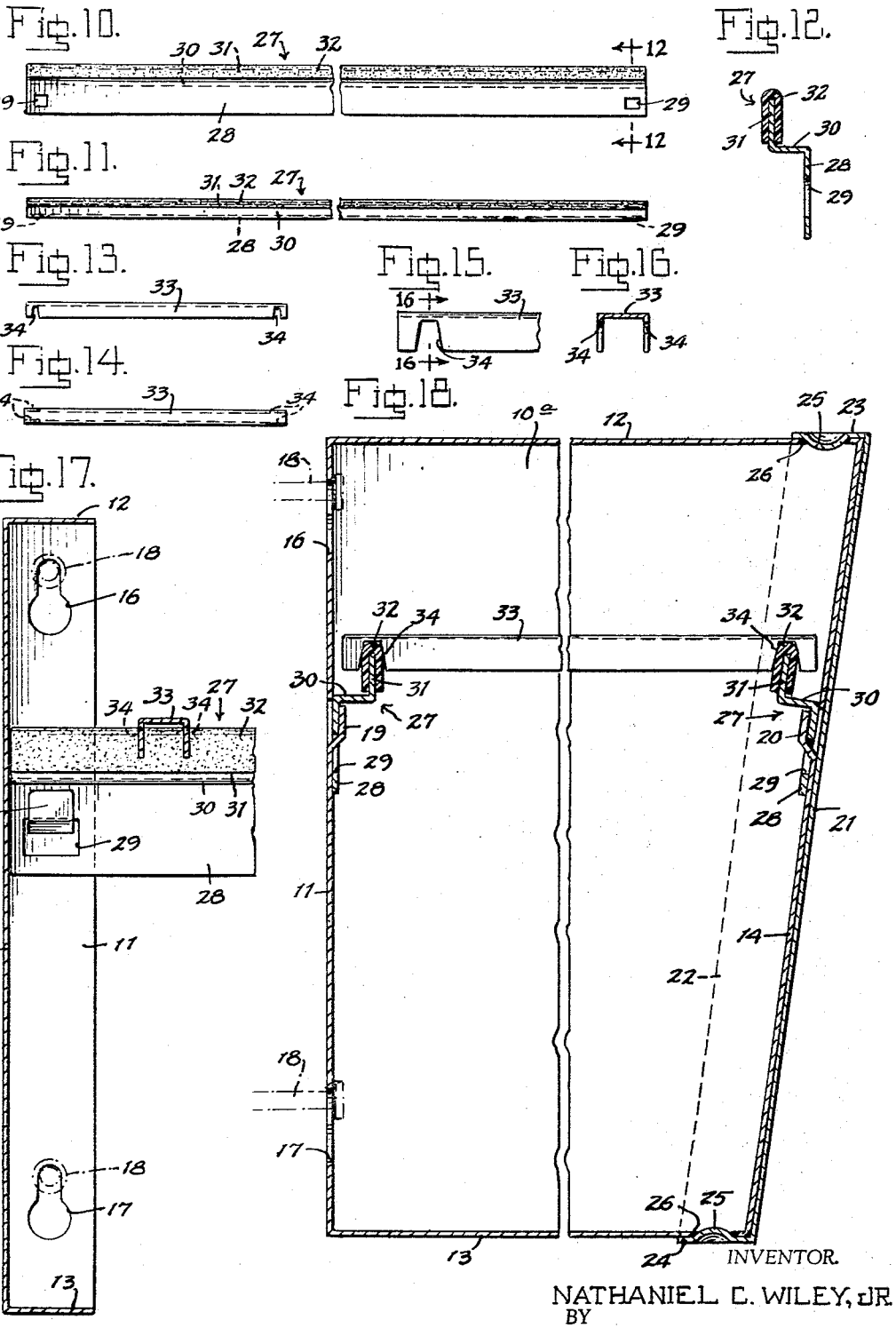

3,331,524
WINDOW BOX FOR POTTED PLANTS
Nathaniel C. Wiley, Jr., Weston, Conn., assignor to Rudkin-Wiley Corporation, Seymour, Conn., a corporation of Connecticut
Filed July 6, 1964, Ser. No. 380,472
11 Claims. (Cl. 220—4)

The present invention relates to a window box for potted plants, and has for an object to provide a window box having readily separable parts capable of packaging in compact kit form, and which may be quickly and easily assembled for mounting upon the side of a house or other suitable supporting structure or disassembled for storage. The window box of the invention is especially adapted for the support of plants contained in conventional flower pots, of the type having an enlarged upper rim portion defined at its lower edge by an annular shoulder, and a further object of the invention is to provide adjustable support means for supporting a plurality of flower pots of various diameters through engagement beneath the annular shoulders of the pots.

Another object is to provide a window box which, by virtue of not being required to support the relatively large weight of earth normally contained in a conventional window box, may be of relatively light weight construction. It is further proposed to provide a window box having an open bottom in which the lower ends of the flower pots are suspended, thus preventing the collection of excessive water which is detrimental to many plants.

Another object is to provide a window box which permits the individual potted plants to be watered and fertilized in accordance with their individual needs. A conventional clay flower pot is slightly porous for the desirable purpose of enabling it to "breathe" and aerate the earth contained therein, and the present arrangement in which the individual flower pots are entirely exposed to the atmosphere effectually permits this.

Other objects and advantages will become apparent from a consideration of the following detailed description taken in connection with the accompanying drawings wherein a satisfactory embodiment of the invention is shown. However, it will be understood that the invention is not limited to the details disclosed but includes all such variations and modifications as fall within the spirit of the invention and the scope of the appended claims.

In the drawings:

FIG. 1 is a perspective view, partially broken away, showing the window box mounted beneath a window and having potted plants supported therein;

FIG. 2 is an elevational view of the outer side of one of the two end panels;

FIG. 3 is a top plan view of the end panel;

FIG. 4 is a front end view;

FIG. 5 is a vertical sectional view taken along the line 5—5 of FIG. 2;

FIG. 6 is an elevational view of the outer side of the other of the two end panels;

FIG. 7 is an elevational view of the outer side of the front panel;

FIG. 8 is a top plan view of the front panel;

FIG. 9 is a vertical sectional view taken along the line 9—9 of FIG. 7;

FIG. 10 is a side elevation of one of the two index strips;

FIG. 11 is a top plan view of the index strip;

FIG. 12 is an enlarged sectional view taken along the line 12—12 of FIG. 10;

FIG. 13 is a side elevation of one of the plurality of cross bar members;

FIG. 14 is a top plan view of the cross bar member;

FIG. 15 is an enlarged side elevation of one end portion of the cross bar member;

FIG. 16 is a sectional view taken along the line 16—16 of FIG. 15;

FIG. 17 is an enlarged fragmentary sectional view taken along the line 17—17 of FIG. 1; and FIG. 18 is an enlarged sectional view, partially broken away, taken along the line 18—18 of FIG. 1.

Referring to the drawings, the window box according to the exemplary embodiment of the invention illustrated therein comprises a pair of end panels 10 and 10a, preferably formed of sheet metal, the two panels being of identical construction but of reverse left and right form, and each having a vertical inwardly extending rearward edge flange 11, horizontal inwardly extending top and bottom edge flanges 12 and 13, and an upwardly and outwardly inclined inwardly extending forward edge flange 14. The vertical edge flange is adapted to be engaged with and supported upon the wall 15 of a house or other suitable supporting structure to support the window box, and for this purpose is provided with a pair of key hole slots 16 and 17 respectively adjacent its upper and lower ends for interlocking engagement with headed nails or screws 18. Intermediate the upper and lower ends of the rearward edge flange 11 there is provided an inwardly and upwardly projecting hook 19 blanked from the flange, and in opposed horizontally aligned relation thereto the forward edge flange 14 is provided with a similar inwardly and upwardly projecting hook 20. These hooks are for the purpose of receiving longitudinally extending index strips, as will presently more fully appear.

A longitudinally extending front panel 21 of rectangular form is provided at its ends with inwardly extending edge flanges 22—22, and along its respective upper and lower edges with inwardly extending longitudinal edge flanges 23 and 24, the latter flanges each being disposed in a horizontal plane while the front panel is disposed in an inclined plane corresponding to the inclination of the forward edge flanges 14 of the end panels 10 and 10a. The inside dimension of the front panel between the longitudinal edge flanges 23 and 24 substantially corresponds to the length of the forward edge flanges 14 of the end panels, so that the forward marginal portions of the end panels may be fitted within the flanges of the front panel as clearly indicated in FIGS. 1 and 18, and releasably retained through the snap engagement of detent bosses 25 provided adjacent the ends of the longitudinal edge flanges 23 and 24 of the front panel in detent holes 26 provided in the upper and lower edge flanges 12 and 13 of the end panels adjacent their forward ends.

A pair of identical longitudinal index strips 27 are provided to extend between the forward and rearward edge flanges of the two end panels through connection with the hooks 19 and 20. Each index strip comprises a mounting portion 28 provided adjacent its ends with rectangular holes 29 for interlocking engagement with the hooks 19 or 20 of the end panels, a horizontal intermediate portion 30, and a vertical upper portion 31 offset from the mounting portion 28. A plastic strip 32 of nylon or other suitable material of inverted U-shape in cross-section is cemented or otherwise suitably secured over the upper portion 31. As clearly seen in FIGS. 17 and 18 the two index strips extend in horizontally opposed reversed relation to each other longitudinally between the forward and rearward edge flanges of the end panels, with the plastic covered upper portion 31 of the rearward strip in outwardly offset relation to the house wall 15 upon which the window box is mounted, and with the plastic covered upright portion 31 of the forward strip in inwardly offset relation to the front panel.

A plurality of cross bars 33 of inverted channel form span the index strips in spaced relation, and each is provided in its two side walls adjacent its ends with upwardly tapered notches 34 for engagement with the plastic strip, and so dimensioned that the side edges of the notches slightly indent or bite into the plastic strip through downward pressure applied upon the bar. The cross bars may thus be effectually secured against movement upon the index strips, and at the same time they may be readily disengaged for adjustment. In practice the angularity of the side edges of the notches 34 is slightly greater, for example 9°, than the angle of inclination of the front panel, for example 8°, so that as is clear from FIG. 18 their edges will bite into the inclined forward index strip as effectually as with the vertically disposed rearward index strip.

As clearly shown in FIG. 1 each pair of cross bars is adapted to support a flower pot 35 by engaging beneath the annular shoulder 36 of the upper rim 37 of the flower pot, the adjustability of the cross bars permitting the support of flower pots of different diameters in any desired spaced arrangement within the window box.

What is claimed is:

1. A window box for potted plants wherein each pot includes a rim at its upper end having a downwardly facing annular shoulder, said window box comprising a pair of oppositely disposed longitudinally spaced end panels, a longitudinally extending front panel, means for releasably retaining said front panel in engagement with said end panels, a pair of transversely spaced longitudinal index strips extending between said end panels, means for releasably retaining said index strips in engagement with said end panels, means for releasably retaining said cross bars in engagement with said index strips, and a plurality of pairs of pot supporting cross bars transversely spanning said index strips in spaced relation to each other and adjustable longitudinally of said index strips, the cross bars of each pair being adjustable toward and away from each other independently of the other cross bars and having upper surfaces to engage the underside of said annular shoulder of the rim of a pot at opposite sides thereof through spacing of said pair of cross bars to fit beneath said rim.

2. A window box for potted plants wherein each pot includes a rim at its upper end having a downwardly facing annular shoulder, said window box comprising a pair of oppositely disposed longitudinally spaced end panels, a longitudinally extending front panel, a pair of transversely spaced longitudinal index strips extending between said end panels, a plurality of cross bars transversely spanning said index strips in spaced relation to each other and adjustable longitudinally of said index strips, a plastic facing strip upon each of said index strips, and notch means carried by said cross bars having edge surfaces for pressing into biting engagement with said facing strips.

3. The window box as defined in claim 2, wherein each of said cross bars is in the form of a channel strip of inverted U-shape cross-section, and said notch means comprises opposed notches in the sides of said channel strip adjacent each end opening downwardly and having upwardly convergent side edges.

4. The window box as defined in claim 2, wherein said index strips each include a longitudinal upwardly directed strip portion, and said plastic facing strip is of inverted U-shape in cross-section with said strip portion received therein.

5. The window box as defined in claim 4, wherein said index strips each include a longitudinal downwardly directed strip portion laterally offset from said upwardly directed strip portion, and a connecting strip portion between said upwardly and downwardly directed strip portions.

6. A window box for potted plants wherein the pot includes rim at its upper end having a downwardly facing annular shoulder, said window box comprising a pair of oppositely disposed longitudinally spaced four-sided end panels each defined by a rearward inwardly extending edge flange, inwardly extending upper and lower flanges and a forward inwardly extending edge flange, a longitudinally extending front panel defined by inwardly extending end flanges and longitudinally extending upper and lower flanges, the forward marginal portions of said end panels being received within the end portions of said front panel respectively in abutting relation with the end flanges of said front panel and with the upper and lower flanges of said end panels in abutting relation with the inner sides of the said upper and lower edge flanges of said front panel, means for releasably retaining said front panel in engagement with said end panels, a pair of longitudinal index strips respectively extending between the forward edge flanges and the rearward edge flanges of said end panels, means for releasably retaining said index strips in engagement with said forward and rearward edge flanges of said end panels, and a plurality of cross bars transversely spanning said index strips in spaced relation to each other and adjustable longitudinally of said index strips.

7. The window box as defined in claim 6, wherein said rearward edge flanges of said end panels are vertically disposed and have key-slot means for receiving headed nails or the like in interlocking relation.

8. The window box as defined in claim 6, wherein said means for releasably retaining said index strips in engagement with said forward and rearward edge flanges of said end panels comprises upwardly directed hook means carried by said forward and rearward edge flanges, and slot openings adjacent the ends of said index strips for receiving said hook means in interlocking relation.

9. The window box as defined in claim 6, wherein said means for releasably retaining said front panel in engagement with said end panels comprises detent bosses carried by said upper and lower flanges of said front panels and detent openings in said upper and lower edge flanges of said end panels engageable by said bosses.

10. The windox box as defined in claim 6, wherein said rearward edge flanges of said end panels are vertical, said upper and lower edge flanges thereof are horizontal, and said forward edge flanges thereof are inclined upwardly and outwardly.

11. The window box as defined in claim 10, wherein said front panel is rectangular and inclined upwardly and outwardly in correspondence with the inclination of said forward edge flanges of said end panels, said end flanges thereof are disposed in vertical planes, and said upper and lower flanges thereof are disposced in horizontal planes.

References Cited

UNITED STATES PATENTS

| 1,300,629 | 4/1919 | Macaw | 47—39 X |
| 2,610,759 | 9/1952 | Slade | 220—22 |

FOREIGN PATENTS

| 471,131 | 8/1937 | Great Britain. |
| 71,707 | 1/1953 | Netherlands. |

THERON E. CONDON, *Primary Examiner.*

GEORGE E. LOWRANCE, *Examiner.*